Oct. 12, 1965   W. T. BRISTOW, JR   3,211,427
ERECTION APPARATUS
Filed Jan. 3, 1961   4 Sheets-Sheet 4
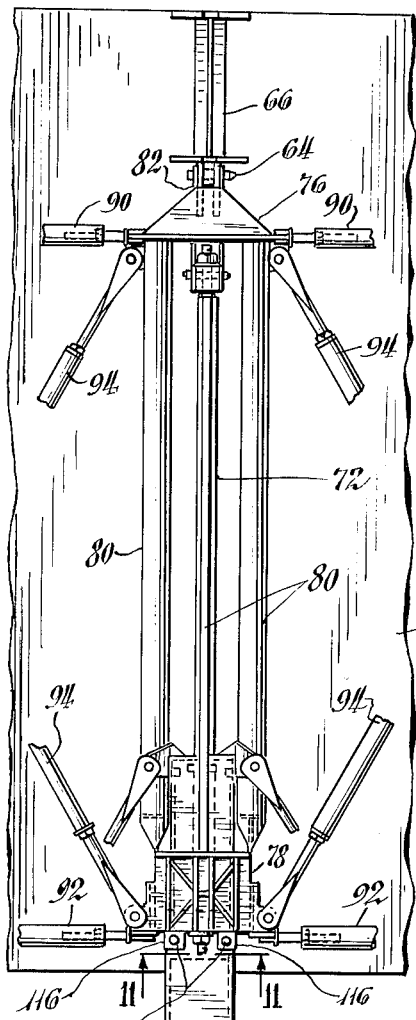
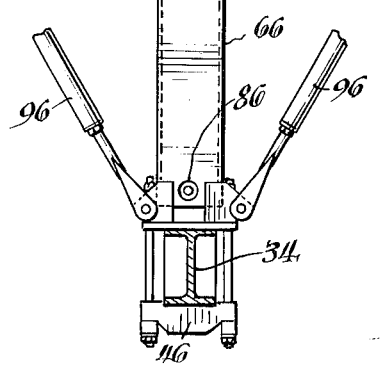
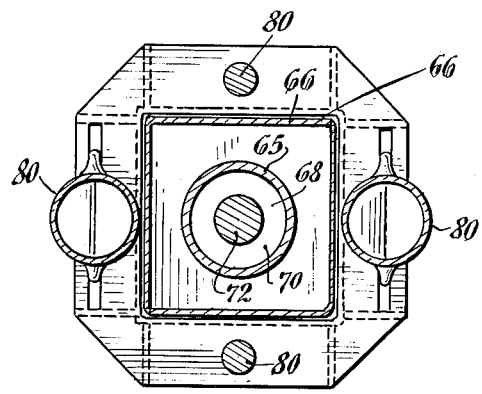
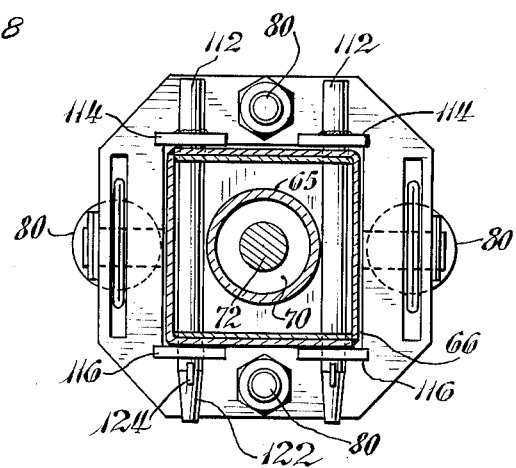
*INVENTOR:*
WILLIAM T. BRISTOW, JR
*By Byron, Hume, Groen & Clement*
*Attorneys.*

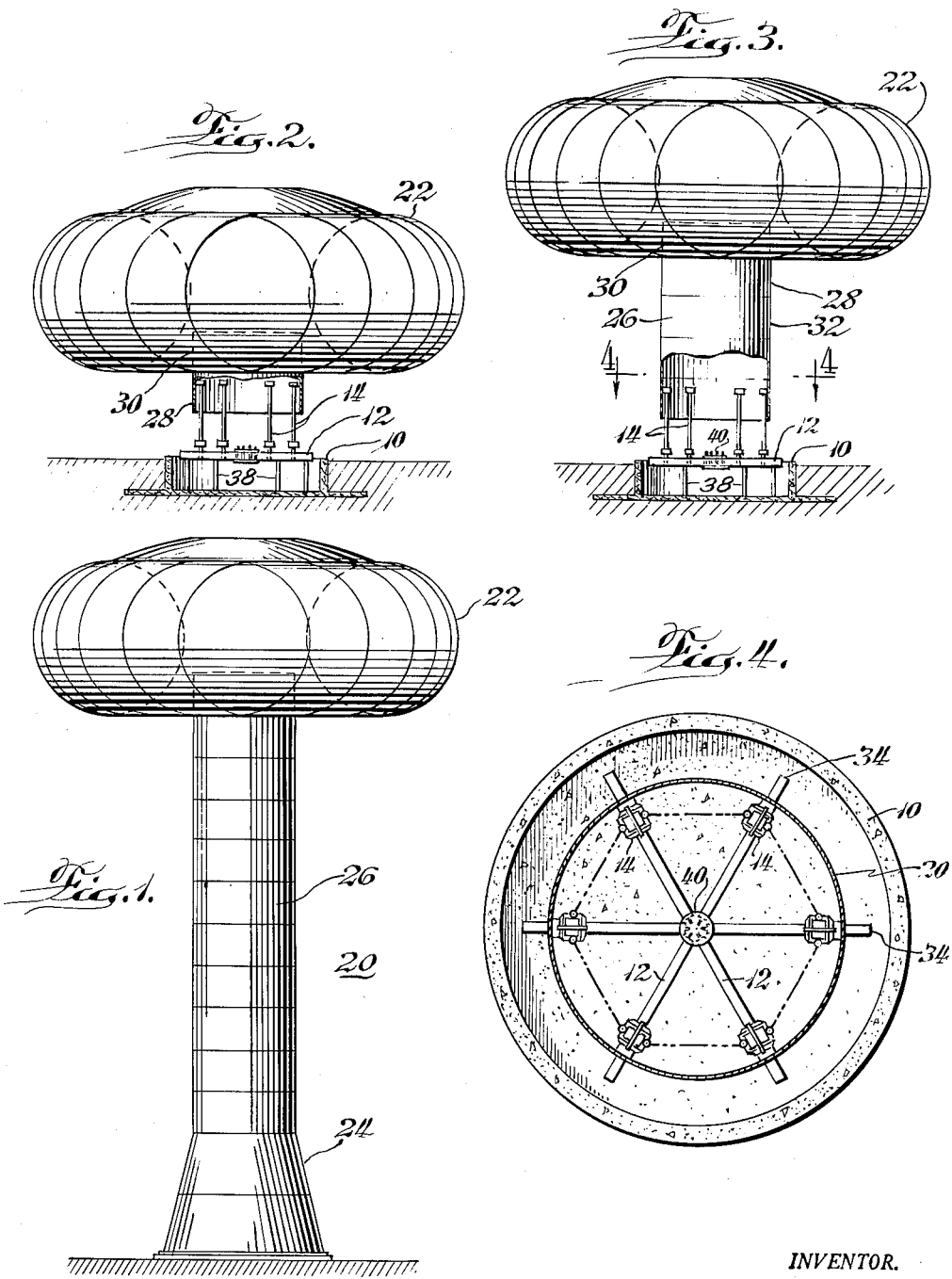

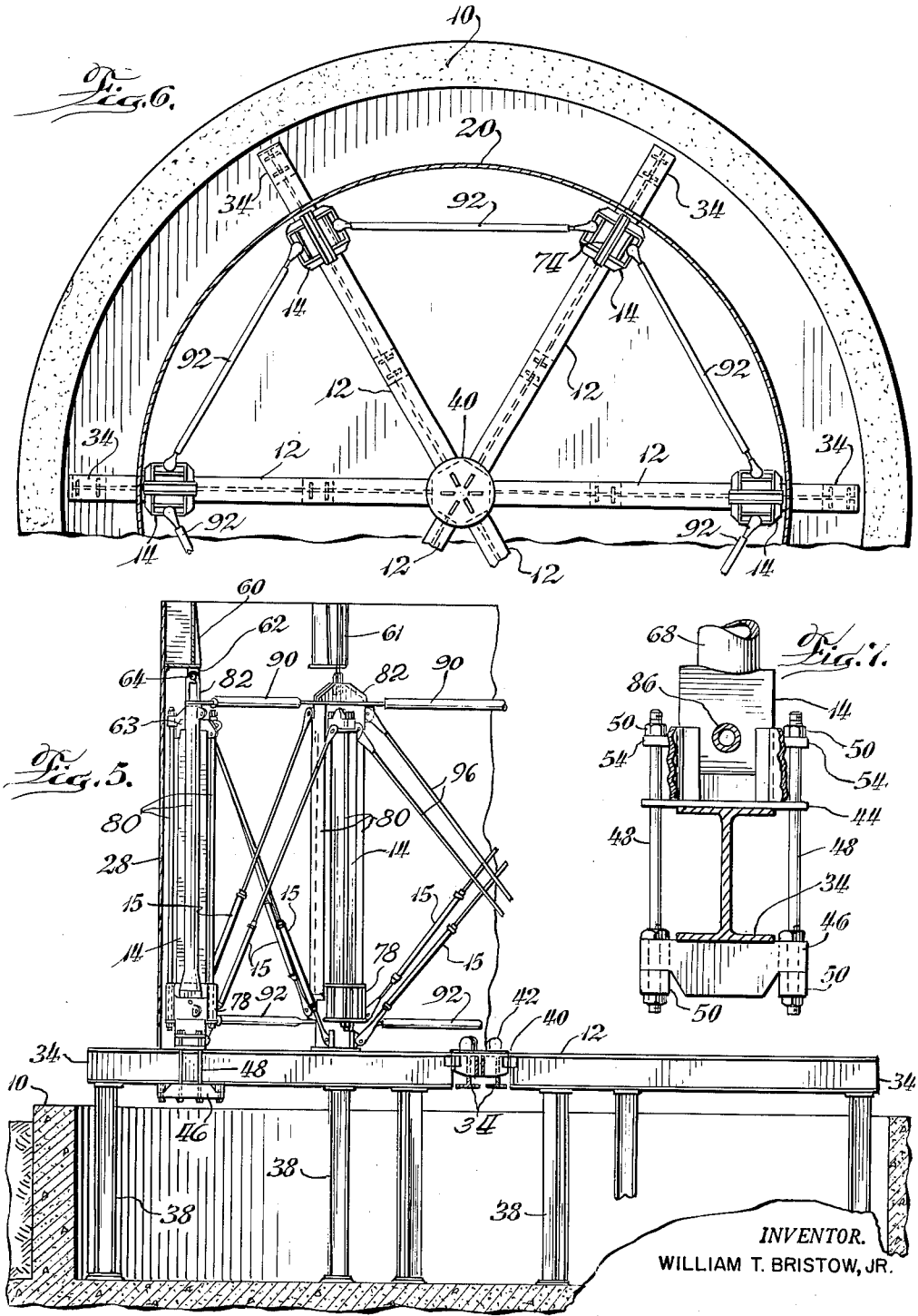

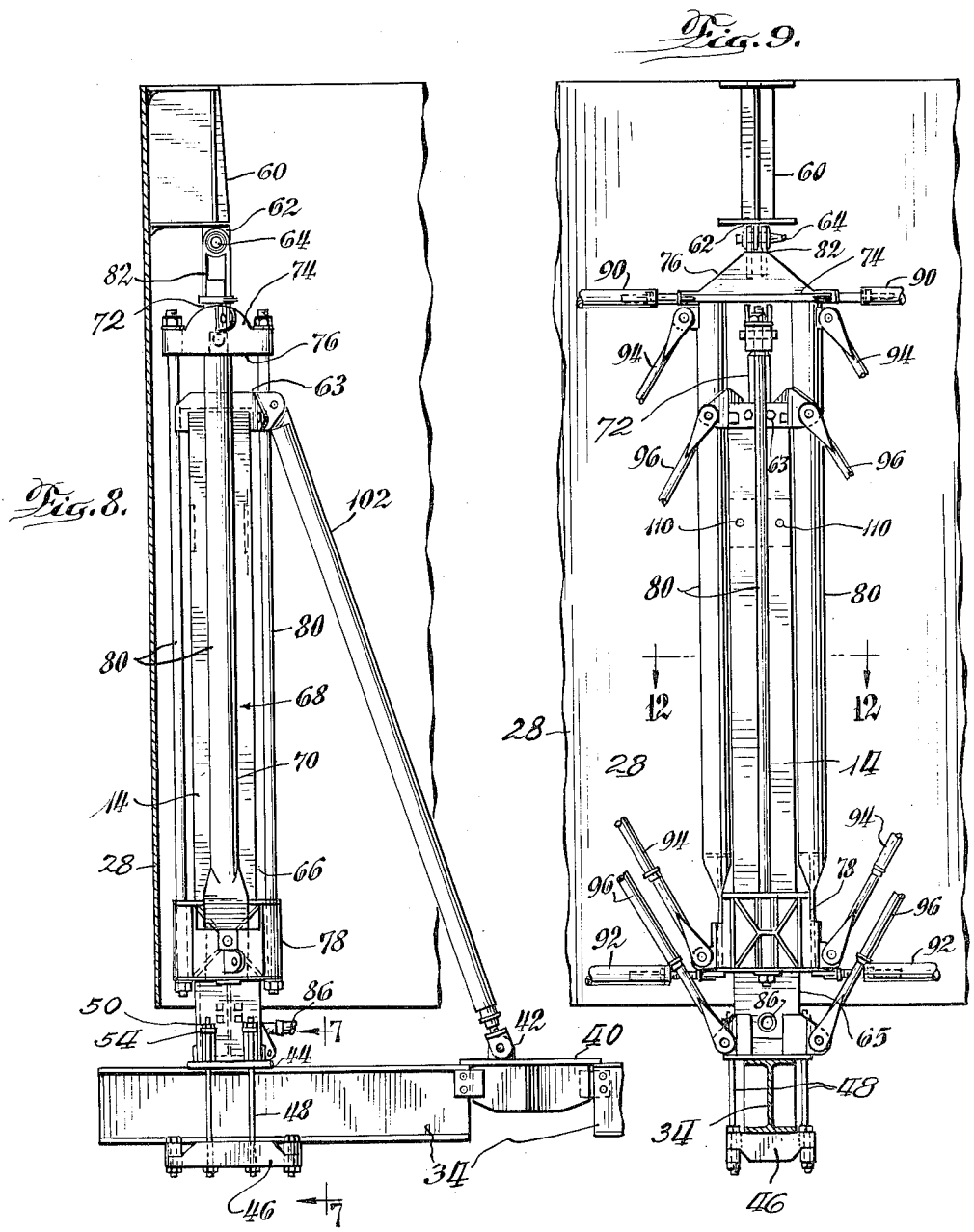

United States Patent Office 3,211,427
Patented Oct. 12, 1965

3,211,427
ERECTION APPARATUS
William T. Bristow, Jr., 16 Farvardin Ave., Teheran, Iran
Filed Jan. 3, 1961, Ser. No. 89,596
4 Claims. (Cl. 254—89)

This invention relates in general to the erection of a tower or the like and, in particular, to erection apparatus utilized for that purpose.

It is a general object of this invention to provide improved erection apparatus for the erection of a tower or the like.

It is another object of this invention to provide erection apparatus for erecting a tower or the like that is particularly suitable for the erection of flared type towers.

It is another object of this invention to provide erection apparatus for erecting a tower o rthe like wherein substantially the entire tower is assembled at ground level in sections and sequentially lifted upwardly from the ground section by section by the erection apparatus.

It is another object of this invention to provide an erection apparatus particularly suitable to the erection of flared type towers or the like wherein substantially the entire tower is assembled at ground level in sections and elevated upwardly section by section by the erection apparatus.

It is another object of this inventon to provide erection apparatus for the erection of a tower or the like wherein the erection apparatus remains fixed in a horizontal plane and wherein substantially the entire tower is assembled at ground level in sections and elevated upwardly section by section by the erection apparatus.

It is another object of this invention to provide an erection apparatus particularly suitable for the erection of flared type towers and wherein the tower or the like is substantially entirely assembled at ground level in sections and elevated upwardly section by section and wherein the erection apparatus is secured adjacent the base of the tower and is movable radially to accommodate for the flaring of the tower.

It is another object of this invention to provide improved lifting means utilized at the erection of towers or the like.

It is another object of the invention to provide improved lifting means comprising a plurality of lifting members that are particularly adapted to the erection of towers and the like.

Briefly, the invention comprises erection apparatus particularly suitable to the erection of flared type towers or the like although not limited to the erection of flared type towers. The erection apparatus is adapted to sequentially elevate tower sections after each tower section has been assembled to the tower. The erection apparatus is secured adjacent the base of the tower and does not move upwardly with the raised tower sections and is adapted for radial movement relative to the base of the tower to compensate for the flaring of the tower or the like when needed. The erection apparatus is provided with a plurality of lifting members each of which is provided with a lifting arm. The plurality of lifting members are adapted to simultaneously lift a tower section after assembly to the tower. The lifting members are each adjustably secured in place and to one another and the lifting arms of the lifting members are adjustably secured to one another. The lifting members are adapted to lift a tower section upwardly after assembly to the tower and then hold the lifted tower section in place while another tower section is assembled to the lifted tower section. The lifting members are subsequently disengaged from the elevated tower section and the procedure is repeated after all necessary adjustments for the flaring of the tower have been made.

The invention, both as to its organization and method of operation, taken with further objects and advantages thereof, will best be understood by reference to the following description taken in connection with the accompanying drawings, in which:

FIGURE 1 is a diagrammatical front elevational view of a flared tower which may be erected by use of the erection apparatus embodying the features of the invention;

FIGURE 2 is a partially cut-away diagrammatical front elevational view illustrating a tower after the first lift by the erection apparatus embodying the features of the invention;

FIGURE 3 is a partially cut-away diagrammatical front elevational view of a tower after several sections of the tower have been lifted by the erection apparatus embodying the features of the invention;

FIGURE 4 is a digrammatical plan view illustrating the arrangement of the erection apparatus embodying the features of the invention;

FIGURE 5 is a fragmentary elevational view illustrating in more detail the lifting members in a lowered position and the arrangement of the erection apparatus embodying the features of the invention and digrammatically illustrating supporting interlinking adjustable strut members of the erection apparatus embodying the features of the invention;

FIGURE 6 is a fragmentary plan view diagrammatically illustrating the erection apparatus embodying the features of the invention and particularly illustrating horizontal interlinking struts and the base support member of the erection apparatus;

FIGURE 7 is a diagrammatical cross section view of one lifting member illustrating the means for radial movability of the lifting member;

FIGURE 8 is a diagrammatical elevational view illustrating one of the lifting members in greater detail and in a slightly raised position;

FIGURE 9 is a diagrammatical elevational view illustrating one of the lifting members in a slightly raised position and particularly illustrating the interlinking struts between adjacent lifting members;

FIGURE 10 is a diagrammatical elevational view illustrating one of the lifting members in an elevated position and also the positions of the interlinking struts between adjacent lifting members;

FIGURE 11 is a cross sectional view taken along the line 11—11 in FIGURE 10; and, FIGURE 12 is a cross sectional view taken along the line 12—12 in FIGURE 9.

Referring now to the drawings, the erection apparatus embodying the features of the invention may be utilized to erect a tower such as the tower structure 20 illustrated in FIGURE 1. The tower structure 20 is comprised of an upper toroidal tank 22, a substantially cylindrical tower portion 26 and a flared bottom tower portion 24. Tower structures and the like of various configurations may be erected through the use of the erection apparatus embodying the features of the invention.

Initially a foundation 10 upon which the erected tower will be supported is constructed. Subsequently, a base support 12 is erected and a plurality of lifting members 14 are assembled in place on the base support 12. The top portion of the tower may be assembled as desired and in the illustrated tower 20 the two top sections 28 and 30 are initially assembled to the toroidal tank 22 before elevation of the tower is begun. The lifting members 14 are secured to the lower top tower section 28 and then extended thereby raising the two top tower sections 28 and 30 and the toroidal tank 22 from adjacent ground level as shown in FIGURE 2. After the first lift of the top portion of the tower 20 has been completed an additional tower section 32 is then welded or otherwise secured to the elevated top section 28 and the lifting members 14 are subsequently disengaged from the elevated top section 28 and the entire tower is permitted to be supported on the newly assembled section 32. The lifting members 14 are subsequently engaged with the newly assembled top tower section 32 and the lifting procedure is repeated. FIGURE 3 illustrates the tower 20 after three new sections of the tower have been assembled to the tower. The lifting procedure is repeated until a flaring of the tower is required. The lifting members 14 are then moved radially outward after each subsequent flared tower section has been assembled to the already erected portion of the tower. The procedure is continued until the entire tower has been elevated and the entire tower finally comes to rest on the tower foundation 10.

It can be seen that a tower has been erected substantially entirely at ground level and each new additional tower section is assembled to a lifted tower section and subsequently lifted itself and another additional tower section is assembled to it.

Referring now to FIGURE 4 wherein the erection apparatus is illustrated in more detail. The base member 12 upon which the plurality of lifting members 14 are supported is comprised of a plurality of radially extending I-beam spoke members 34 extending from a central support hub 40. The plurality of lifting members 14 are radially movable on the spoke members 34 and can move in or out towards or away from the central support hub 40. The erection apparatus is therefore suitable for erecting flared type towers and the like. The lifting members 14 are each connected by struts diagrammatically illustrated in dotted lines in FIGURE 4. The struts are adjustable to provide for the radial movement of the lifting members 14.

FIGURES 5 and 6 more clearly illustrate additional details of the base support member 12 and the lifting members 14. The base support members 12 are, in the embodiment of the invention illustrated in the drawings, comprised of six radially extending and symmetrically positioned I-beam spoke members 34. The lifting members 14 are radially movable on the I-beam spoke members 34 and are interconnected by a plurality of struts some of which are illustrated in FIGURES 5 and 6. All of the struts are adjustable in length and the adjustability may be provided by a plurality of turnbuckles such as turnbuckles 15. The base support member 12 may be supported upon foundation 10 by a plurality of vertical columns 38, one for each I-beam spoke member. For strengthening purposes the plurality of vertical columns 38 may be interconnected by diagonal and horizontal struts (not shown) if desired. Each of the I-beam spoke members 34 is fastened to the central supporting hub 40 which is provided with a fastening lug 42 for each of the lifting members 14. A supporting strut shown in FIGURE 8 extends from each lifting member 14 to the respective fastening lug 42 provided therefor on the central supporting hub 40.

FIGURE 7 illustrates the means for slidably securing a lifting member 14 to a radial I-beam spoke member 34. Each of the lifting members 14 is provided with a lower base member 44 positioned contiguous with the upper surface of the I-beam spoke member 34 and upon which rests each individual lifting member 14. A securing plate member 46 is positioned on the under side of the I-beam spoke member 34 and the lifting members 14 are secured to the I-beam spoke member 34 by means of a plurality of compression rods 48 extending through the lower base member 44 and the securing plate member 46. The plurality of compression rods 48 are threaded on each end and a plurality of securing nuts 50 are threadably engaged with the compression rods 48 so as to squeeze the lower base member 44 and the securing plate member 46 together so as to secure the lifting member 14 to the I-beam spoke members 34. In FIGURE 7 a plurality of lugs 54 are shown to be positioned over the upper end of the compression rods 48 and the tightened down securing nuts 50 exert a pressure through the lugs 54 thus securing the lower base member 44, the securing plate member 46 and the I-beam spoke members 34 together through this means.

FIGURE 5 illustrates the position of the lifting members 14 before the first lift of the tower has occurred. The tower rests and is supported on the base support member 12 and in the position shown in FIGURE 5 the lifting members 14 are completely lowered and do not support the tower at all. The tower may be supported on support bearings secured to the base member 12 if desired although such bearings are not illustrated in the drawings. Lift lug 60 is secured to the shell of the tower and preferably by welding to transmit the lifting force from the lifting member 14 to the tower shell. One such lift lug 60 is secured to the tower shell for each lifting member 14. The lift lug 60 is provided with a depending lip 62 to which the lifting members 14 may be readily attached by means of a plurality of pins 64.

Referring now to FIGURES 8 through 12 for a description of the lifting members 14, the lifting members 14 are comprised of a square column member 66 attached to the base member 44. The square column member 66 extends from the base member 44 to column cap 63 positioned on the top portion of the column member 66. A hydraulic cylinder assembly 68 is positioned within the square column member 66. The hydraulic cylinder assembly 68 comprises a cylinder 65 having positioned therein a lifting plunger 70. Secured to the lifting plunger 70 is a drive arm 72. The drive arm 72 is secured at its upper end to a jacking collar assembly 74 which comprises an upper jack collar 76 and a lower jack collar 78. The upper jack collar 76 is attached to the lower jack collar 78 by means of tie rods 80. The jacking collar assembly 74 is capable of vertical movement with respect to the square collar member 66. The upper jack collar 76 has attached thereto a bifurcated jack collar lug 82 which extends around the depending lip 62 of the lift lug 60 and is provided with apertures through which the pin 64 is inserted.

The plurality of lifting members 14 are hydraulically operated and may be operated in unison by a single operator so as to insure an even lift. Hydraulic fluid is selectively admitted to the hydraulic cylinder assembly 68 through an opening 86 provided near the bottom of the column element 66. Fluid entering the hydraulic cylinder assembly 68 pushes the lifting plunger 70 upwardly thereby causing the drive arm 72 to move in an upward vertical direction. The uppermost portion of the drive arm 72, as has been previously stated, is secured to the jacking collar assembly 74 and a movement of the drive arm 72 in a vertical direction causes the jacking collar assembly 74 to also move in a vertical direction thereby exerting a lifting force against the lift lug 60 secured to the shell of the tower to cause the shell of the tower to be lifted in a vertical direction.

As can be seen in FIGURE 5, the plurality of lifting members 14 are interconnected by a plurality of diagonal and horizontal struts. In the embodiment of the invention illustrated in the drawings an upper horizontal strut 90 extends from the upper jack collar 74 of each lifting member 14 to adjacent upper jack collars 74 of the adjacent lifting members 14. The upper horizontal strut as well as other struts interconnecting the lifting members 14 is adjustable in length and the adjustability may be provided by the use of turnbuckles. A lower horizontal strut 92 extends between the lower jack collar 78 of each individual lifting member 14 as is indicated in the drawings. A pair of diagonal struts 94 positioned on opposite sides of the jacking collar assembly 74 extend from the upper jack collar 76 of each lifting member 14 to the lower jack collar 78 of adjacent lifting members 14, as is indicated in the drawings. A further pair of diagonal struts 96 are positioned on opposite sides of the column member 66 and extend from the column cap 63 of each column member 66 to the lower portions of adjacent column members 66 of adjacent lifting members 14. A supporting strut 102 extends from each column cap 63 of the column member 66 to the fastening lug 42 provided therefor and positioned on the central support hub 40 of the base member 12.

All the aforementioned struts are adjustable so as to provide for the radial movement of the lifting members 14 and the adjustability may be provided by turnbuckles provided in the struts. As can be seen in the drawings, each jacking collar assembly 74 is interconnected with the adjacent jacking collar assemblies 74 of adjacent lifting members 14 and when the jacking collar assemblies 74 move in a vertical direction the interlinking struts between adjacent jacking collar assemblies 74 move upwardly with the jacking collar assembly 74 of each lifting member 14 and thereby provide support for each jacking collar assembly 74 when the jacking collar assemblies 74 are moved to a raised position. Each column member 66 is also secured to each adjacent column member 66 by means of interlinking struts and a similar support structure is provided for each column member 66. Further, an additional bracing strut 102 is provided for each lifting element 14 and is attached to each column member 66.

The erection of a tower utilizing the apparatus illustrated in the drawings embodying the features of the invention proceeds as follows: initially a foundation for the tower is constructed such as the foundation 10 illustrated in the drawings and a base support member 12 comprising a plurality of radially extending I-beam spoke members 34 and the central support hub 40 is assembled within the foundation 10. The plurality of lifting members 14 are then secured in the desired position on the radial extending spoke members 34 and the plurality of securing nuts 50 are tightened thereby securing the plurality of column members 66 to the radially extending I-beam spoke members 34. The interlinking upper horizontal struts 90, the lower horizontal struts 92, and the diagonal struts 94 and 96 are adjusted and secured between each adjacent lifting member 14 as previously described. The support strut element 102 is then adjusted and attached at its lower end to the central support hub 40. Hydraulic fluid under pressure is made available for the lifting members 14 by any desired means. The upper portion of the tower to be erected is then assembled around the lifting members 14. The lift lugs 60 are welded to the shell of the tower section to be elevated and the depending lip portion 62 of the lift lug 60 is secured to the upper bifurcated extension 82 of the jack collar assembly 74 and the tower is then in position for its first lift. Hydraulic fluid is supplied to each of the lifting members 14 through the apertures 86 provided in the column members 66 therefor and the lifting plunger 70 of each lifting member 14 moves in a vertical direction upwardly thereby causing the jacking collar assembly 74 of each lifting member 14 to move in a vertical direction thus lifting the tower section to which the jacking collar assembly 74 is attached. Means (not shown) are provided to insure that each lifting member 14 is moving at the same rate as every other lifting member 14.

As the jacking collar assemblies 74 move in a vertical direction the interlinking struts 90, 92 and 94 interlinking adjacent jacking collar assemblies 74 move in unison with the jacking collar assemblies 74 and thereby provide supporting rigidity to resist wind pressure and also to insure that each jacking collar assembly 74 is moving upwardly with each other jacking collar assembly 74. The plurality of column members 66 remain in place secured to the base support 12 and the plurality of column members 66 are rigidly positioned in place against movement by means of the supporting struts 102 and the interlinking diagonal struts 96.

FIGURE 5 illustrates the position of the lifting members 14 and the tower shell just before a lift has begun.

FIGURE 8 illustrates the position of the lifting members 14 and the tower shell just after the lifting members 14 have been actuated and the jacking collar assemblies 74 moved upwardly in a vertical direction. Lifting continues until the bottom surfaces of the lower jack collar 78 move past a pair of support pin apertures 110 extending through the column member 66. As soon as the bottom surfaces of the lower jack collar 78 have been raised past the pin support apertures 110, further elevation of the jacking collar assembly 74 is terminated and a pair of support pins 112 are inserted through the column member 66. The jacking collar assembly 74 may then be moved downwardly until the lower portion of the lower jack collar 78 rests on and is supported by the support pins 112. The lifting member 14 in its raised position is illustrated in FIGURE 10. The support pins 112 are substantially cylindrical and have a tapered end portion 122. A pair of support washers 114 are formed on the pair of support pins 112 and are positioned contiguous with the surface of the column member 66 when the support pins 112 are inserted into the support apertures 110. An additional pair of support washers 116 are then inserted over the end of the support pins 112 after the support pins 112 have been inserted through the apertures 110. A pair of keys 124 are then inserted in apertures provided therefor in the end portions 122 of the support pins 112 to position the washers 116. The entire weight of the elevated tower will then be supported upon and plurality of pins 112.

After the tower section has been raised and the support pins 112 inserted into the support apertures 110 in the column members 66, the hydraulic pressure is adjusted and the jacking collar assemblies 74 are lowered to be positioned on the supporting pins 112. The next tower section is then welded to the lifted tower at ground level. After the next tower section has been assembled to the lifted tower, the hydraulic means (not shown) are then activated and the jacking collar assemblies 74 are raised just enough to draw the support pins 112 from the support apertures 110 in the column members 66. The support pins 112 are then withdrawn from the support apertures 110 and the jacking collar assemblies 74 are slowly lowered. The jacking collar assemblies 74 will then lower the newly assembled section to the base support 12. If desired, bearing lugs specifically designed to support the tower may be positioned on the base support member 12. After the tower is brought to rest on the base support 12, the pins 64 are withdrawn disengaging the lifting members 14 from the lift lugs 60 and the jacking collar assemblies 74 are further returned to their initial position. The procedure is repeated until the entire tower is assembled.

If the newly assembled tower section is flared and further flaring is desired, then the lifting members 14 are moved radially outwardly in preparation for the next lift. The lifting members 14, as has been previously described, are movable on the radially extending I-beam spoke members 34 and may be readily moved by loosening the plurality of securing nuts 50 and then sliding the lifting members 14 outwardly. Of course, the strut members interconnecting the lifting members 14 must be extended so as to allow the radial movement of the lifting members 14 on the radial I-beam spoke members 34. The struts may be adjusted by means of turnbuckles integrally formed within the struts.

After the lifting members 14 are moved radially outward the required distance as determined by the flaring of the tower, they are again secured to the radially extending I-beam spoke members 34 by tightening the plurality of securing nuts 50. The lifting members 14 are then attached to the assembled tower section, as previously described, and the assembled tower section is ready for the next lift.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. Elevating apparatus for lifting an enclosed plate assembly used in tower or the like construction comprising: a support means composed of a plurality of radially extending support rails, a plurality of peripherally spaced lifting members mounted on said support rails, said lifting members adapted to be secured to said plate assembly, said lifting members being selectively fixed with respect to said support means and slidable relative thereto, said lifting members comprising a stationary column element and an arm element, said arm elements movable with respect to said stationary column element to lift the plate assembly, a first plurality of struts interlinking said arm elements of each lifting member and a second plurality of struts interlinking said stationary column elements of each of said lifting members.

2. Elevating apparatus for lifting a plate assembly used in the construction of a tower or the like, comprising: base support means, a plurality of vertically disposed lifting members mounted on said support means, said lifting members normally being arranged in a ring and mounted on said support means for selective movement toward and away from each other to enlarge or diminish the size of said ring, means for connecting said lifting members to a plate assembly, and strut means interconnecting said lifting members, said strut means being adjustable to facilitate radial movement of said lifting members, said lifting members adapted to raise the assembly relative to said base support means.

3. Elevating apparatus for lifting a plate assembly used in the construction of a tower or the like, comprising: base support means including a plurality of radially disposed support rails, a plurality of vertically disposed lifting members mounted on corresponding support rails for selective radial movement on said rails relative to each other to adapt to the circumference of the plate assembly, and means for connecting said lifting members to the plate assembly, said lifting members adapted to raise the assembly relative to said base support means.

4. The elevating apparatus of claim 3 further characterized by and including clamping means for selectively clamping said lifting members to corresponding support rails.

References Cited by the Examiner
UNITED STATES PATENTS

| | | | |
|---|---|---|---|
| 1,839,578 | 1/32 | Morton | 29—429 |
| 2,605,540 | 8/52 | Kroll et al. | 29—429 |
| 2,614,800 | 10/52 | Garlinger et al. | |
| 2,636,715 | 4/53 | Griffin. | |
| 2,708,012 | 5/55 | Talcott | 189—3 |
| 2,919,896 | 1/60 | Wurst | 254—105 |
| 2,993,679 | 7/61 | Morgan | 254—89 |

WILLIAM FELDMAN, *Primary Examiner.*

CORNELIUS D. ANGEL, HARRISON R. MOSELEY, MILTON S. MEHR, *Examiners.*